July 2, 1963
W. A. REDENBAUGH
3,096,255
METHOD AND MECHANISM FOR SEPARATION
OF SOLUTES FROM SOLVENTS
Filed May 31, 1956
6 Sheets-Sheet 1
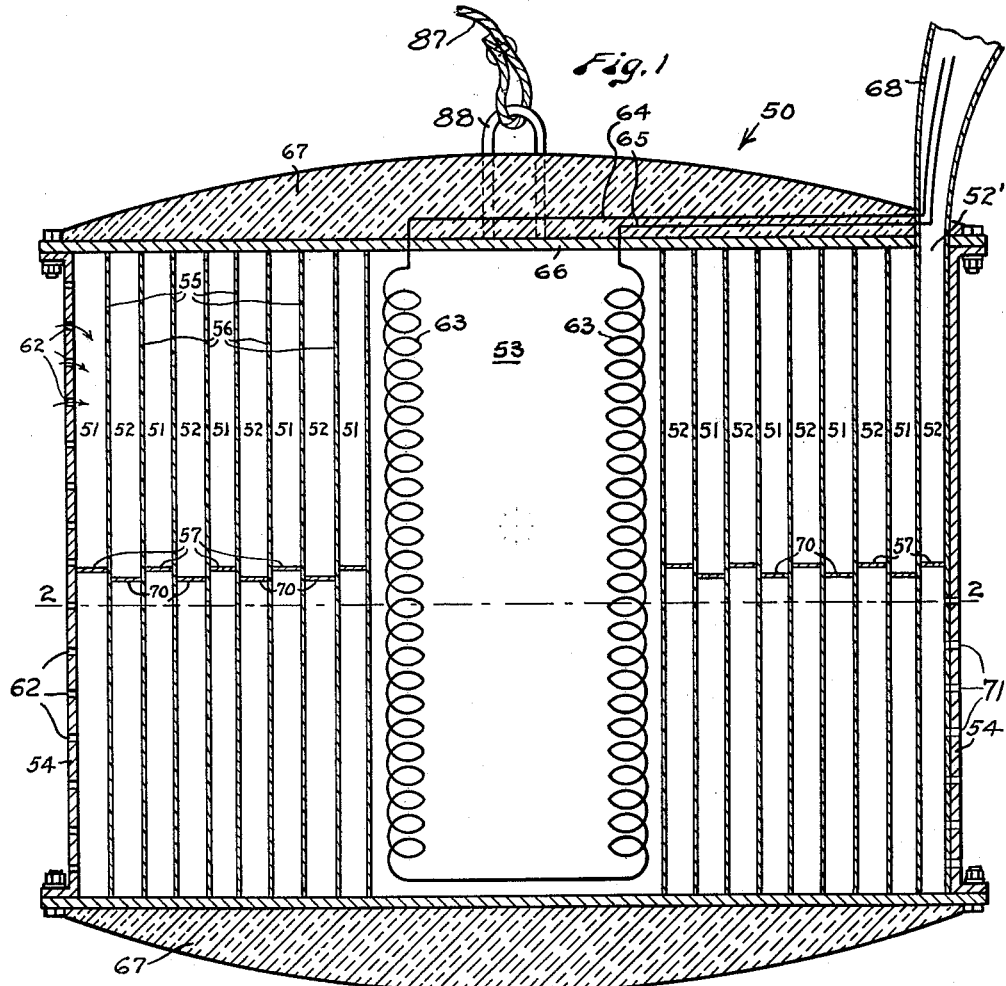
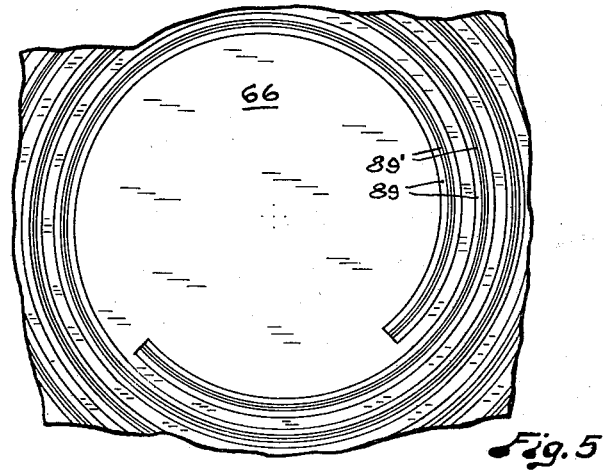
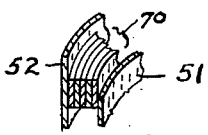
INVENTOR.
William A. Redenbaugh
BY
G. Wright Arnold
ATTORNEY INVENTOR.
William A. Redenbaugh
BY
ATTORNEY

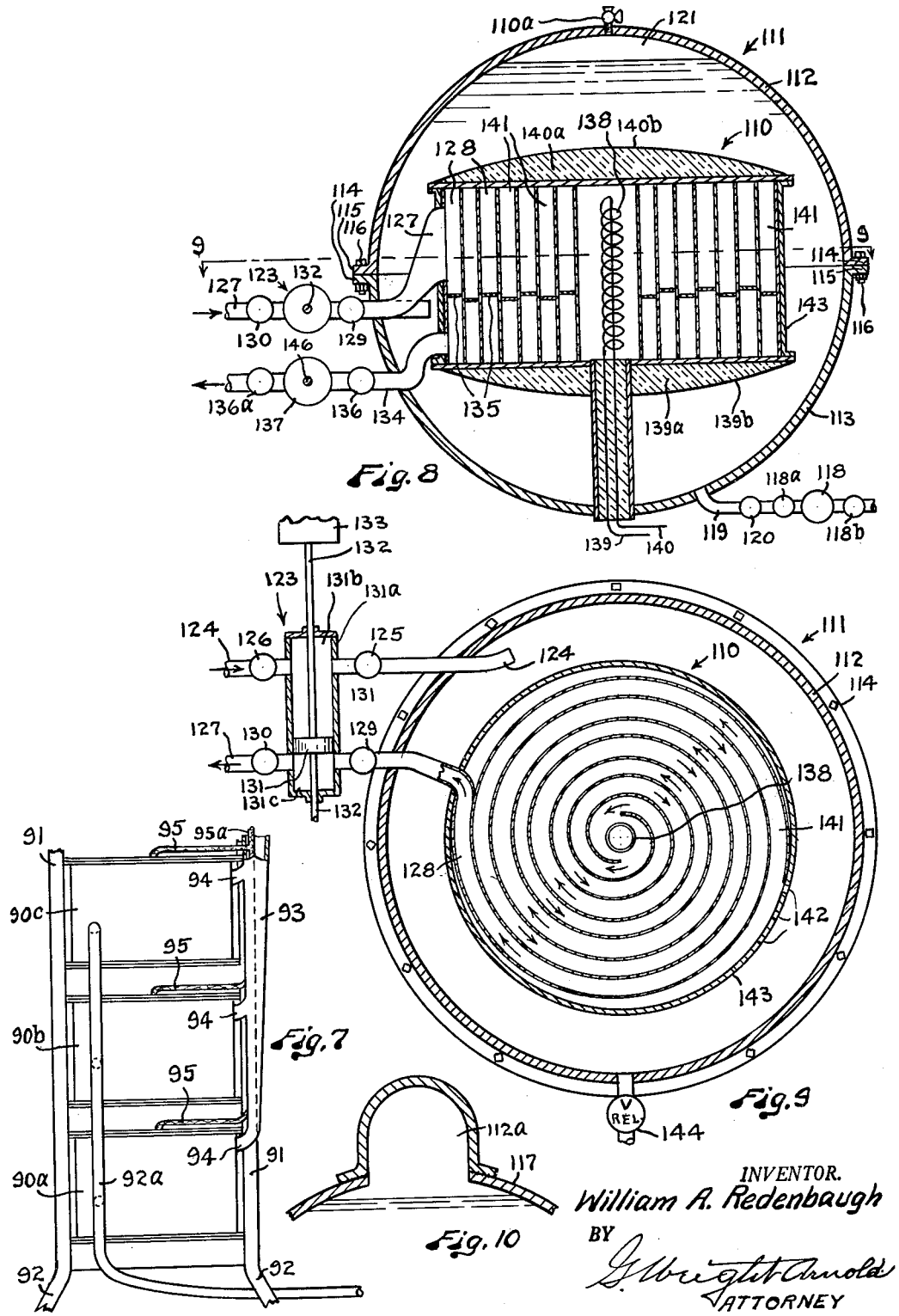

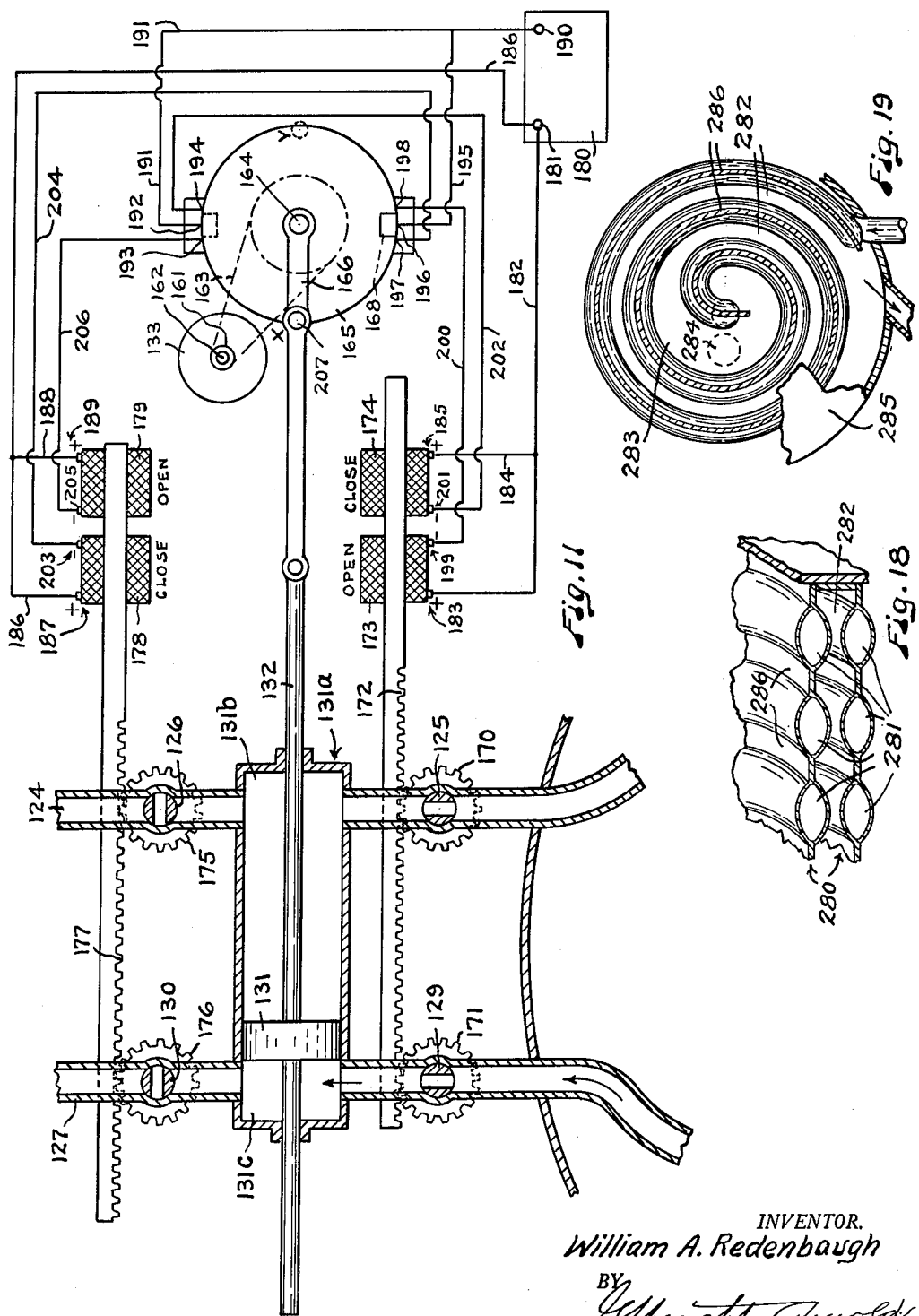

July 2, 1963
W. A. REDENBAUGH
3,096,255
METHOD AND MECHANISM FOR SEPARATION
OF SOLUTES FROM SOLVENTS
Filed May 31, 1956
6 Sheets-Sheet 5
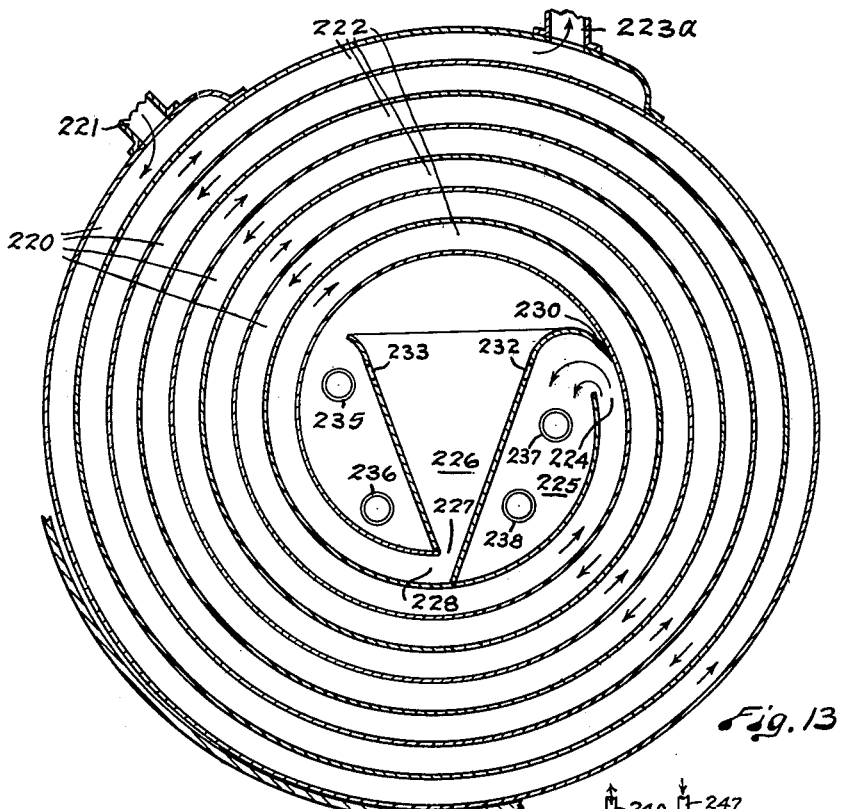
Fig. 13
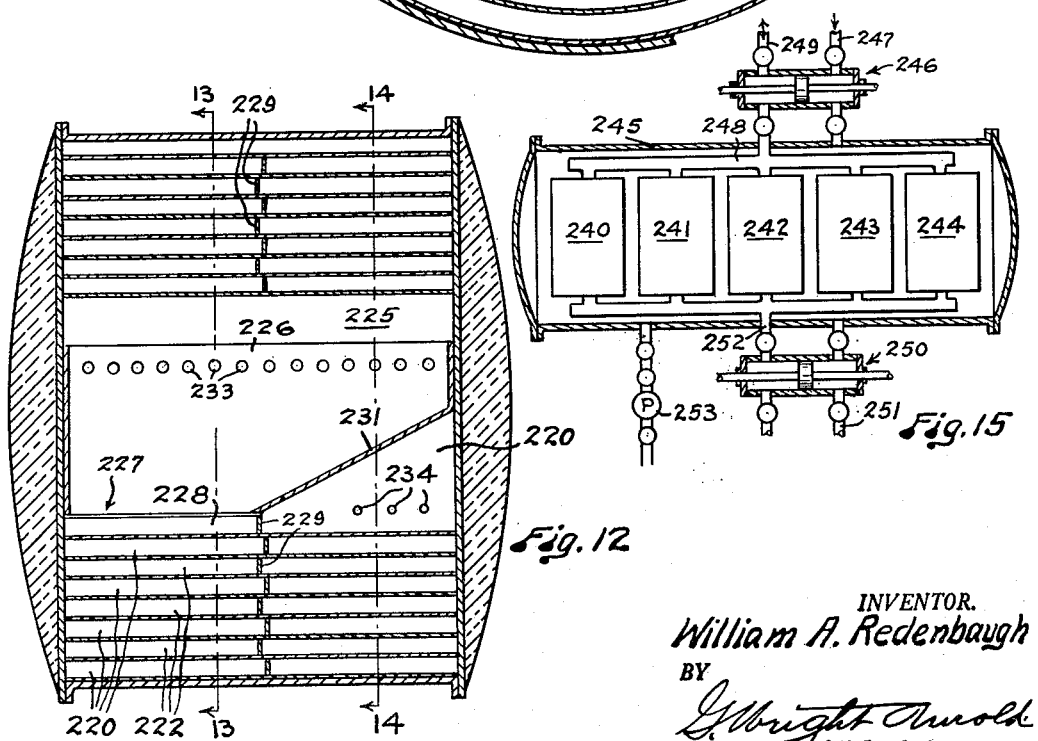
Fig. 12
Fig. 15
INVENTOR.
William A. Redenbaugh
BY
*G. Wright Arnold*
ATTORNEY

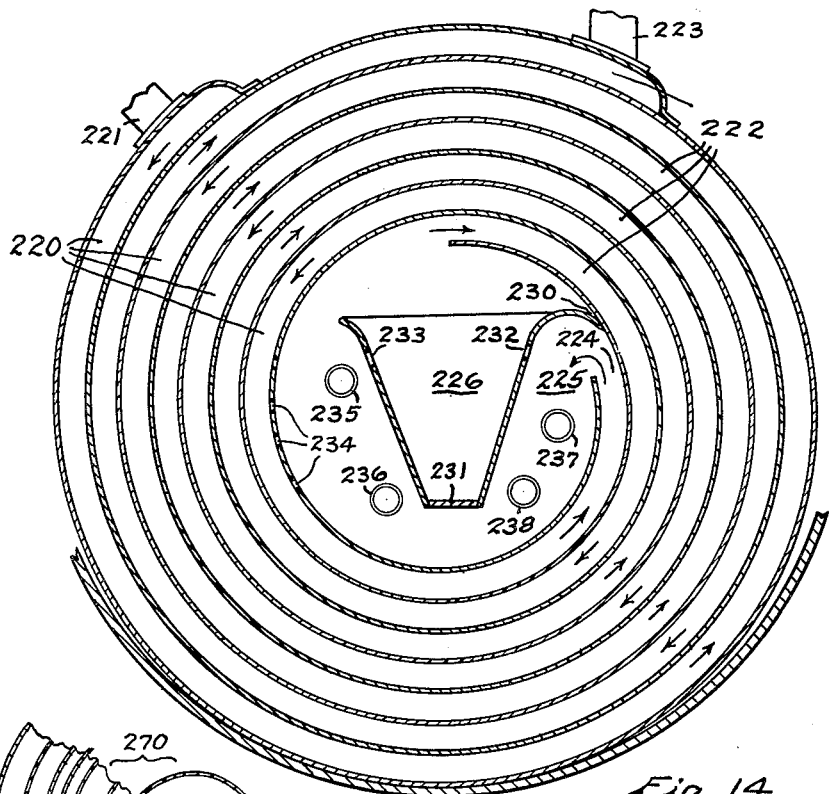
Fig. 14
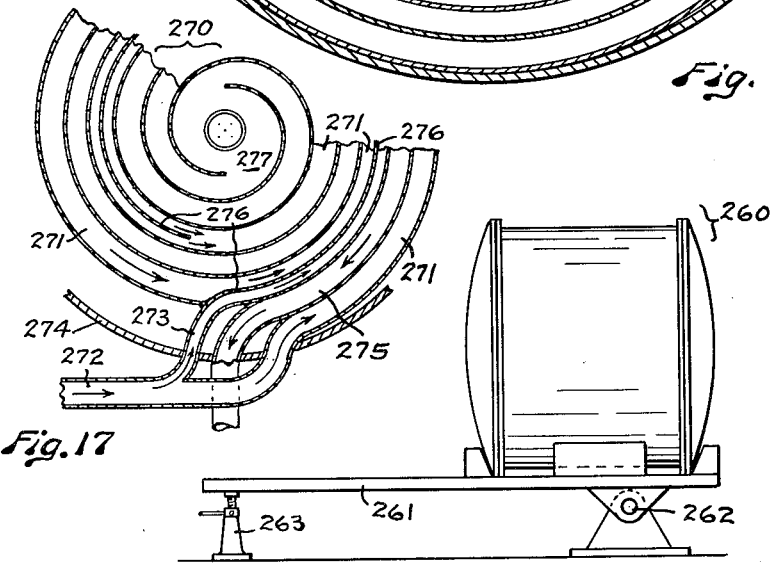
Fig. 17
Fig. 16
INVENTOR.
William A. Redenbaugh
BY
ATTORNEY

3,096,255
METHOD AND MECHANISM FOR SEPARATION OF SOLUTES FROM SOLVENTS
William A. Redenbaugh, Friday Harbor, Wash., assignor of one-half to G. Wright Arnold, Seattle, Wash.
Filed May 31, 1956, Ser. No. 588,546
17 Claims. (Cl. 202—51)

My invention relates to the method and mechanism for the separation of solutes from solvents.

More particularly my invention relates to the continuous method and mechanism therefor, both being characterized by their simplicity, for the commercial, practical and economical separation of solutes from solvents where conditions in the relatively little known field of critical pressure and critical temperature are involved. A practical application obtains in the removal of salt components from sea water in providing potable or "fresh" water.

In achieving this fundamental result, the primary purpose of my invention and discovery is to provide a relatively light weight heat exchanger apart from the enclosing casing as a fundamental part of my invention and discovery, said exchanger being characterized by its extremely thin walled construction and high efficiency, in contrast to the very heavy walled and expensive and inefficient and complex mechanism and processes and devices heretofore proposed. In short, we have as a source of ample supply salt water to be treated as in subterranean courses but of course largely in the form of oceans and seas of water touching the coast line of our country—the seas covering three-quarters of the world's surface. Accordingly, it is a primary and fundamental purpose of my invention and discovery to provide an inexpensive and efficient means and continuous process for treating sea water, and converting such sea water as may be required into a condition adapted for the use of human, animal, and vegetable life.

In general, the primary and fundamental object and purpose of my invention is to provide a method and mechanism therefor for the continuous separation of a solute from solvent.

For purposes of clearness and definiteness of description and disclosure, I will set forth my invention and discovery as applied to the separation of sea water into its solutes and solvent components, the same being done by way of explanation and not limitation. It will be understood that my said invention and discovery is applicable to situations where like conditions exist in whole or in part.

With this understanding, my invention and discovery includes a continuous process of salt water conversion into fresh water and brine or salt crystals. The sea water is continuously caused to flow through a heat exchanger of my invention comprising inlet and outlet passageways for adjacent counterflowing streams, which passageways are subjected to balancing pressures formed of relatively thin walls of heat transferring material, and which walls are spirally interlockingly, parallelingly disposed about an axial compartment, which compartment has therein an outlet terminus for said inlet passageway and which compartment has an outlet terminus for said compartment in which heating means for said streams is located—said pressure and temperature for said streams being provided of the critical magnitude or greater for sea water. The part of the spiral channel leading to the axial compartment being termed the inlet passageway or channel, for conducting the cold sea water to be treated. The part of the spiral channel leading from the axial compartment being termed the outlet passageway or channel for the hot water. Such arrangement provides for said passageways to be in contacting paralleling relation with only the said thin wall dividing the two counterflowing streams. The said axial compartment, provided between the axial opening of the spiral inlet passageway and the axial opening of the spiral outlet passageway, serves as a settling chamber for the solutes in addition to the location for the heating means. In said axial or settling compartment, the said heating means is provided to impart to said sea water being treated, a desired and necessary temperature which may be equal to or above the critical temperature to convert the sea water into the vapor phase involved in the "critical" pressure and "critical" temperature treatment. Such temperature for general working purposes for sea water may be considered as approximately 800° F. and the working pressure as approximately 4500 p.s.i., such magnitudes being, of course, greater for sea water than for fresh water. Such pressure magnitude may be automatically provided by disposing the heat exchanger in the seat at a depth of ten thousand feet. This depth occurs off the coast of Monterey, California, Catalina Island, middle of the Mediterranean Sea close off the tip of Italy to name only a few places close to land. Also such pressure may be produced on shore by high pressure pumps on sea water pumped into a steel shell as set forth hereinafter.

In order to maintain a liquid at the critical point it must be kept under a pressure equal to or above the critical pressure. For instance, it is impossible to raise the temperature of fresh water to its critical temperature (705.4° F.) unless it is under a pressure of 3226 pounds per sq. in. If the pressure is less than this, the water will begin to boil at a temperature less than the critical temperature, and the temperature of 705.4° F. cannot be reached. Authorities give different figures for critical temperature even for pure water, such difference evidencing newness of the problem. If the pressure is higher than the critical pressure the water can be heated to 705.4° F. without boiling. It will then change into the vapor phase without boiling or the further addition of heat. In other words, the heat of vaporization at the critical point is 0 B.t.u. If the temperature is raised above the critical point, the vapor acts like super-heated steam. Increasing the pressure cannot change the vapor back into a liquid as long as the temperature and pressure are both at or above the critical point. My process, by reason of the high temperature, operates as a sterilizing step making the water truly potable.

And further, my invention relates to the separating of the fresh water from the brine or crystal salt portion developed upon such circulation and treatment. Such amount of the separated salt or brine portion may be recovered as a useful article of commerce, as may be desired.

Furthermore, the primary and fundamental object and purpose of my invention is the providing of that fundamental necessity for sustaining human, animal and vegetable life, namely, pure water for areas where the water is disappearing in large measure or has already disappeared.

So desperate and critical has become the question of ample supply of water that several States are presently involved in ligitation against each other over the right to take water from rivers that flow through the States involved. Accordingly, the solution of this water requirement for just the part devoted to human consumption, to say nothing of industrial or irrigation requirements, is of tremendous concern and most important. However, my invention is of such an efficient and simple character that it also can provide for the needs of animal life and for agricultural purposes and industrial uses. All this manifestly relates to the problem of the most vital concern to the health and welfare of the country. The Department of Commerce currently states that the consumption of water will be doubled by 1975. The above relates to the commanding importance of my discovery and invention.

The mode of operation of my invention involving as one feature the spiral counterflow arrangement of the sea water to be treated and the treated water requires that its solutes and the axial compartment operate to control the heat of the treated portion of the water by extending or conducting its heat through the thin wall to the untreated incoming sea water, the outer coils of the heat exchanger, having therein cold sea water, functioning to insulate the inner coils with the water therein. Thus, the water is heated enroute to the axial compartment by the water enroute from the axial compartment. Thus, for economy sake, full use is made of the heat in the axial compartment and of the coils of heated water enroute from the axial compartment to treat the incoming water. However, also the spiral coiled counterflowing streams of water both hot and cold do in fact operate to insulate against the loss of heat, the cold portion so operates as well as the cooling hot portion. The coils of water being excellent insulators operate to conserve the heat of the more axially disposed coils even though one may be of greater temperature than the other.

A further primary and fundamental object of my invention is to provide a heat exchanger characterized by its operation and construction providing for a minimum of deposition of sediment and also providing for the smoothness of surface of the passageway wall and providing an axially disposed settling compartment between the outlet of the inlet passageway and the inlet of the outlet passageway.

While the temperature conservation as set forth above is of great importance, nevertheless of equal or possibly greater importance as making possible the conservation of the temperature is the manner in which my invention and discovery employs the high pressure of tremendous magnitude of the critical pressure of sea water, approximately some 4500 pounds per sq. in or some 300 atmospheres. Despite this high magnitude of pressure the structure of the spirally disposed wall of my invention is extremely thin, even of thinness which relatively may be called "paper thin," in relation to the pressure and masses involved. This is achieved in my invention and discovery by disposing the inwardly flowing cold sea water to the axial compartment and the outwardly flowing water from the axial compartment in pressure balancing relation by such parallel contacting spiral counterflow arrangement of the passageways and the providing of the axial compartment in the center thereof as a part of the course of the flow, i.e. inlet stream empties into said axial compartment and continues through the axial compartment into the outlet passageway. These two streams in my said spiral arrangement of the heat exchanger are subjected to the same high pressure so that they mutually support in their counterflow course the walls of the passageway by their balancing operation. The dividing wall on one side is subject to the colder sea water enroute to the axial compartment and the other side of said dividing wall is subject to the hot treated water enroute from the axial chamber or compartment. Thus, the very efficient thin wall construction is rendered possible and this in turn makes possible the very efficient heat transfer or exchange through the thin walls in addition to the heat conservation advantage by having the walls of the treated water enroute from the axial compartment enveloped by the sea water enroute to the axial compartment.

In containers for holding pressures of even 3,000 pounds magnitude at the present time, ordinarily a wall of some four inches in thickness of special steel is employed. This gives some idea of the magnitude of such pressures and the great advantage due to arranging for the balancing of pressure by causing the inlet and outlet streams to flow through the axial chamber. Having the streams course through the axial chamber provides also for said compartment to function as a settling chamber.

Thus, it seems fantastic that in the heat exchanger in my invention and discovery, with its flow and counterflow in spiral arrangement passageways through the axial chamber that the walls separating the same may be of the extreme thinness as described above, said thinness being appropriately referred to as "paper-like" thinness. Of course, it is the arranging for the axial chamber or compartment to be directly connected and communicating through both the inlet and outlet passageways with the surrounding liquid (as for example, sea water at ten thousand feet depth), that provides for the said balancing of pressures. All of which, of course, operates to help transmit the heat from the outflowing medium to the incoming medium and thus rendering the axially disposed heating means in the axial compartment of the highest effect and efficiency in creating the critical temperature so that the minimum of power is required to produce the high degree of temperature.

The axial compartment provides a double function; providing in a portion thereof a zone of agitation which facilitates the forming of crystals and also providing in a portion thereof a quiet zone conducive to the settling of precipitation of the crystals. The discharge of the vertical sheet of incoming water from the inlet channel will supply a desirable degree of agitation. Such agitation is desirable in aiding the formation of crystals of the solute, especially the salt component, and causes the precipitation of said solute under the condition therein existing.

A partial partition in the axial chamber provides a zone relatively free of agitation wherein the formed crystals or heavy brine may settle. Also, disposition in the axial compartment of the elements constituting the heating means may be employed as obstructing or baffling means to lessen the agitation of the incoming stream, due to its inherent centrifugal force.

The above relates to the generic features of my invention and discovery. More definitely, my invention involves at least two specific preferred forms, namely (A) one of these involves, for large scale production, the circulating of the salt water to be treated through a heat exchanger of my invention disposed at such depth below the surface of the sea as to utilize the weight or pressure of the superimposed salt water to provide for the development of the critical pressure as one of the steps in converting the salt water into the critical vapor phase—the other step being the production of the critical temperature; and (B) the other preferred specific form of my invention is for land, or sea level or higher operation and is independent of superimposed layers of sea water. It involves the enclosure of the said heat exchanger through which the salt water to be treated is pumped at a pressure which is equal to or above the critical pressure of the salt water being treated, i.e., at least of such a pressure as will provide the critical pressure for the salt water being treated therein.

Heretofore attempts have been made to provide salt water conversion methods and apparatus therefor. However, all such efforts so far as known have failed in providing a practical, economical and simple solution of the problem. Solutions of the problem based on distillation at normal temperature have proven too expensive. The multiple vacuum effect is likewise objectionable for the same reason, particularly as such requires elaborate, extensive, and very expensive installations for the amount of output secured. Extensive experimentation in the attempt to separate salt from sea water in obtaining fresh potable water has been done in using plastic resins as filters and in applying electrolytic treatment.

Proposed solutions of the salt water conversion problem involve in every detail of their construction, equipment which is equal to resisting both high pressure and high temperature or at least one of said factors.

Also, a further objection common to most proposals is that the yield rate is exceedingly small in comparison to the cost of treatment. Moreover, prior art attempts ordinarily involve batch operation which is characterized by small yield and expensive operating costs. The net result of the objections to the proposed solutions of the salt water conversion problem is that none so far as is known or has been publicized, has proven successful for one reason or another. The gradual lowering of the ground water level is presenting an ever increasing and alarming situation to many municipalities, and to agricultural and industrial interests. Even appeals are being made to Congress to lend Federal aid to the solving of the problems presented. Such proposals often are based upon remedies involving the providing of dams for impounding water to provide for its use at times as required and at the same time to prevent damaging floods while being so impounded.

A primary and fundamental purpose of my invention and discovery in providing for salt water conversion is to solve or overcome the above various objections, and to provide a method and apparatus therefor which is characterized by its simplicity, economical construction, and economical maintenance of operation per unit of product produced.

A further primary and fundamental purpose and object of my invention and discovery is to provide for the salt water conversion by a means involving a minimum of added heat energy in providing the critical temperature at the critical pressure of salt water by circulating the salt water and the treated water each in counterflow and spiral directions, thus causing the peripherally disposed coils to function also as self-insulating means for the axially disposed heating means besides functioning to form an axially disposed heating compartment.

A further primary and fundamental object and purpose of my invention and discovery is the providing of highly polished and smooth surfaced walls so that they way operate as reflector means for the infra-red rays developed by the heating means disposed in the axial compartment, and thereby utilize fully and completely all the energy employed in heating to raise the temperature of the solution to its critical temperature. N.B. Such coiled walls not only operate as concave mirrors in reflecting but also operate to focus the infra-red rays upon the water in the axial chamber.

A further primary and fundamental purpose end object of my invention and discovery is to provide a heat exchanger mechanism characterized by its compactness and by passageways formed of thin and extended wall area of heat transmitting material in providing for very high efficiency—said passageways being disposed in an interlocking and spirally coiled relation in providing an axial chamber as a part of the course or path of the liquid streams.

A further primary and fundamental purpose and object of my invention and discovery is to provide a heat exchanger with said axial chamber which may be readily cleaned by causing the sediment or scale removing tool to move continuously circuitously against the walls forming the passageways of said exchanger and compartment.

A further primary and fundamental purpose and object of my invention and discovery is to provide for a heat exchanger mechanism of such construction and design that it may be readily disassembled and that it may also have provisions for the ready insertion for initial experimental purposes of a thermometer, pressure gauges, and other means for determining experimental values, as well as operating routine inspections in established plants.

A further primary object and purpose of my invention and discovery is the providing of a heat exchanger with the axial chamber in which the rate of flow of the liquid may be controlled, as for illustration and not limitation, by the degree of heat imparted to the liquid, or by the pressure to which the liquid is subjected either in inflowing or outflowing. Particularly is this consideration important in the far removed and inaccessible location of the heat exchanger as in the deep sea form of the invention.

A further primary object and fundamental purpose of my invention and discovery is to provide a heat exchanger mechanism characterized by the small percentage, if any at all, of seepage of liquid or fluid through any imperfectly formed or sealed joints which may develop in constructing the spirally disposed passageway walls. By reason of the fact that there is a substantially balanced pressure, substantially equal on both sides of both inlet channel and the outlet channel, as well as by reason of the construction of the grooves receiving the edges of the wall forming sheets of heat transfer material.

A further primary and fundamental object of my invention and discovery is to provide a heat exchanger characterized by the operation and construction in providing for a minimum of deposition of sediment and also providing for the smoothness of or surface of the passageway wall which may be highly polished and providing an axially disposed settling compartment between the outlet of the inlet passageway and the inlet of the outlet passageway. In the above, reference is made to the minimum of deposition of sediments on the passage walls and of course, the maximum of sediments of the solute at the bottom of the passageway and particularly in the axial compartment.

By way of summary and therefore incompletely stated, my invention and discovery may be described as follows: By way of illustration and not limitation, my invention will be described particularly as applied to the conversion of solutes from solution (solvents) as the same especially applies to the separation of salt water into its components of fresh water and salt or brine solution or crystals. In providing for such conversion of salt or sea water, my invention relates to employing in a certain method or manner, the properties of sea water known as critical pressure and critical temperature. In producing or using these properties in the salt or sea water to be treated, the same is caused in my invention and discovery to circulate in a counterflow spiral manner, as hereinabove described, through a heat exchanger mechanism of my invention and of a special novel construction, the said circulation being at or above the critical pressure and critical temperature of salt or sea water. Such circulation being spirally directed in counterflow and interlocking channels toward and then outwardly from the axial compartment of the spiral arrangement of the walls of the heat exchanger providing for a counterflow operation with advantages herein detailed. The water to be treated is conducted spirally in an inlet channel or passageway toward the axis of the spirally formed formation of wall of heat conducting material as metal, said walls being characterized by their exceptional thinness despite the high pressure of sea water involved which is of its critical magnitude.

The heat exchanger part of my invention, it would be understood, is not limited to its application to the salt water treatment or even to separating solutes from solvents, but is applicable as a heat exchanger generally for such uses where such devices are employed and where a balancing of pressure or equivalent operation may be provided.

The above-mentioned general objects of my invention, together with others inherent in the same, are obtained by the mechanism and process illustrated in the accompanying drawings, the same being preferred exemplary forms of the embodiment of my invention throughout which drawings like reference numerals indicate like parts:

FIGURE 1 is a view in vertical section through a device embodying my invention;

FIG. 1A is an enlarged partial view in perspective of the spacer-divider members;

FIG. 5 is a view of the inner side of the cover for the heat exchanger, showing special grooves;

FIG. 6 is a view in cross section of said groove;

FIG. 7 is a view in elevation of a modified form of device embodying my invention, illustrating the heat exchanger devices or units in stacked formation to provide for the combining of the yield of each unit;

FIG. 8 is a view in vertical section of a modified form of device embodying my invention, disposed within a sphere for locating the device on shore or above sea level;

FIG. 9 is a plan view in cross section on line 8—8 of FIG. 8;

FIG. 10 is a view in elevation of a modified form of the top of the sphere showing a dome;

FIG. 11 is a diagrammatic illustration of mechanism to operate and time actuate valves in conduits for injecting into the sphere sea water equal to that withdrawn as fresh water and brine from the outlet channel of the heat exchanger in order to maintain the pressure within the sphere and exchanger substantially uniform;

FIG. 12 is a view in longitudinal vertical section of a preferred modified form of a heat exchanger of my invention disposed on edge, i.e., with its longitudinal axis disposed horizontally and showing a siphon for removing the heavy brine derived from the salt water;

FIG. 13 is a cross sectional view on larger scale than FIG. 12 and on line 13—13 of FIG. 12 showing outlet of hopper connecting with outlet passageway for brine inlet port.

FIG. 14 is a cross sectional view on line 14—14 of FIG. 12 showing outlet for fresh water into outlet passageway relative to the hopper, inlet port being also shown.

FIG. 15 is a top plan view of a modified form of my invention with a plurality of heat exchangers of my invention disposed with the axis of spiral channels horizontal, i.e., the exchangers are on "edge" as in FIG. 12;

FIG. 16 is a diagrammatic view of a platform on which the heat exchanger of my invention as a whole in an enclosure may be mounted on a platform which may be tipped in facilitating the removal of the heavy brine;

FIG. 17 is a view in transverse section of a portion of a modified form of my invention applicable to all forms in providing for more completely recovering or extracting the heat of the outflowing liquid;

FIG. 18 is a view in cross section of a modified form of inlet passageways formed of expanded conduits of a malleable sheet after coiling and leaving space between the coils for the outlet passageway; and FIG. 19 is a view in transverse section of a modified form of heat exchanger having the passageways of FIG. 18 adapted to heat liquids with heated gases.

Figure 2:
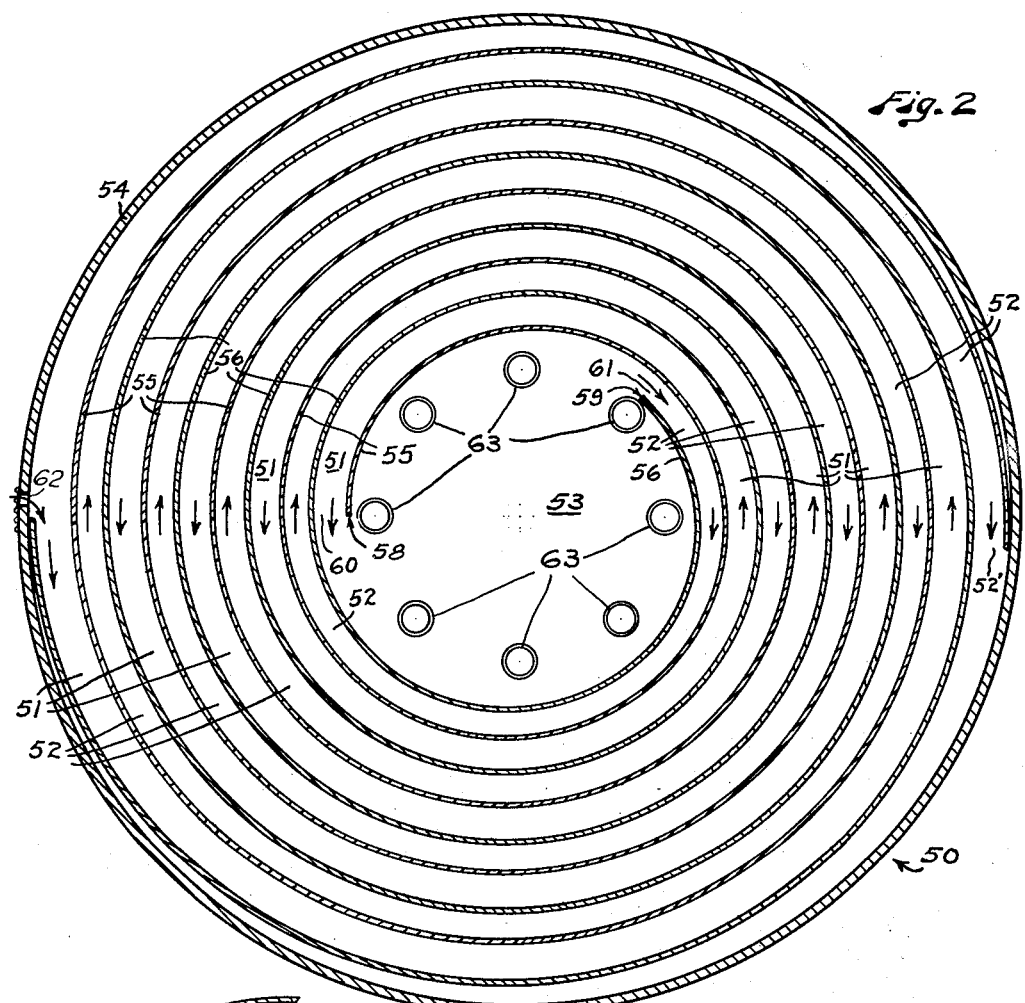
FIG. 2 is a view in cross section on line 2—2 of FIG. 1.

The heat exchanger 50 with associated features is the very basis of my invention. This unique mechanism is characterized by having an inlet 51 and an outlet passageway 52 formed of thin walls of heat transferring material which walls are spirally, contactingly, interlockingly, parallelingly disposed for adjacent counterflowing streams to and from the axial compartment or chamber 53 into which chamber the inlet channel 51 empties through the inlet port 60 and out of which chamber the fluid in vapor phase flows through the outlet port 61 of the outlet channel 52 disposed in the peripheral portion of the spirally coiled channels. The "inlet" and "outlet" terms referring respectively to the direction of flow as respects the axial compartment 53. These "inlet" and "outlet" channels or passageways 51 and 52 may be disposed within a cylindrical casing or housing 54, and may be formed of two sheets 55 and 56 of heat conducting material as follows: sheets 55 and 56 are held apart in spaced relation of the desired width of the inlet channel 51 by supporting divider-spacer 57 of a character to divide the upper half from the lower half. Passageway 52 likewise has supporting divider-spacer 70 which divides the outlet channel 52 into an upper half for the flow of fresh water, while the lower or bottom half provides a passageway for the brine. N.B. The divider-spacer members may be located above or below the middle depending upon what proportion of the water is to be rejected as brine in the outlet channel 52. These divider-spacer members 57 and 70 should be made of the same material as the coiled sheets 55 and 56 to provide for substantially like expansion and contraction. These spacer members 57 and 70, see FIG. 1A, would be alike and formed of an assembly of narrow superimposed plurality of flexible strips to equal the width of the channel 51 or 52 and such strips would thus extend edgewise about their respective channel. The end 58 of sheet 55 extends beyond the end 59 of sheet 56 a distance desired to separate the inlet port 60 from the outlet port 61 within the axial chamber. This assembly of the two sheets is then spirally wound upon itself leaving a space of desired width between the coils in order to form the outlet channel 52 from the axial or central chamber or compartment 53. These channels 51 and 52 may be formed of desired width; they may be of equal width or otherwise as desired for a given operation or capacity output.

The casing or housing 54 may have inlet opening 62 in the form of slots or holes over a segment of the casing for the admission of cold sea or salt water to the inlet channel or passageway 51, which leads or conducts said water to the axial chamber or compartment 53, wherein is located the heating means which may be in the form of electrical heating coils 63 or atomic energy means. Electrical conductors 64 and 65 may pass through the top plate 66 which forms a part of the housing 54, and thence through insulating material 67 to conduit 68 leading to the surface or shore. It will be understood that conduit 68 will rest on the inclined bottom of the sea leading upwardly to the shore line where receiving tanks or storage reservoirs (not shown) may be located.

A hoisting cable 87 secured to the casing or housing 54 by eyelet 88 could lead to a floating buoy of common design which would supportingly suspend the cable. Whenever occasion may require the heat exchanger could be hoisted or raised to the surface by means of the cable 87.

The insulating material 67 for the upper and bottom portions of the water in the channels 51 and 52 protect against the loss of heat from such end portions of the exchanger. The central portion of the coils 51 and 52 and the axial compartment 53 are protected laterally from the loss of heat by the outermost coils of water so that the inlet water in channel 51 is employed to absorb all possible heat from the heated outgoing water to cause said inlet water to be raised to as high a temperature as possible before reaching the axial compartment 53.

The water in outlet conduit 52 is conducted by conduit 68 to the surface after emerging from the outlet port 52' in the peripheral end of outlet conduit 52 after having given up its heat to the water in inlet conduit 51. Water in the axial compartment 53 is heated by the electrical coils 63 to the critical temperature while under the critical pressure. Since the said water in compartment 53 is already under critical pressure, the two critical conditions are developed for the water to pass into what is called the "vapor phase," that is, the condition at which the salt or solutes are removed from the water as crystals or heavy brine. The heating of the water in the inlet channel 51 will proceed in graduated degrees somewhat in advance of reaching the axial compartment since the spiral coil 52 of outlet channel lies parallel and spirally in contacting relation.

To maintain the separation of the precipitated salt crystals and heavy brine from the outflowing fresh water in outlet channel 52, the dividing supporting or spacer wall 70 is provided. The portion of the channel 52 below this wall 70 may have an exit opening 71 whereby the salt component of the treated sea water is continuously expelled or discharged from the heat exchanger mechanism 50 and thus, the device is maintained free of the separated solute.

The treated water, i.e., fresh water, in outlet channel 52, being deprived of its salt and solutes, is consequently of lighter weight than the incoming cold sea water in inlet channel 51 and so would naturally rise toward the surface without any pumping, being under the heavy pressure of the superimposed salt water at that depth it is forced by the entering sea water in channel 51 toward the sea surface. The pressure would be sufficient to raise the water to an elevation above the sea level, about two hundred feet, to feed into the above noted fresh water receiving means located on shore, as tanks or storage reservoirs or other receiving means. This arrangement renders protection to the conduit 68 only necessary for that portion exposed to the wave and tide movement at the surface. Such protection could be supplied by means of a heavy shielding casing. In the lower depths little movement would be encountered. In starting operation, pumping the water from the conduit 68 would serve initially to provide for the conduit 68 to be filled with a sufficient length of column of fresh water, and then the pressure of the sea at the depth involved would operate to force upward the lighter column of fresh water.

The conduit 68 may be formed of noncorroding plastic material and be extruded, i.e., formed on a vessel as payed or let run out.

Figure 3:
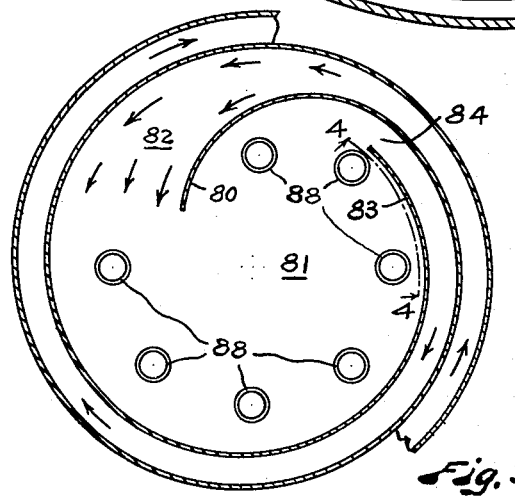
FIG. 3 is an enlarged view in cross section of a preferred form of the axial chamber and adjacent coils.
Figure 4:
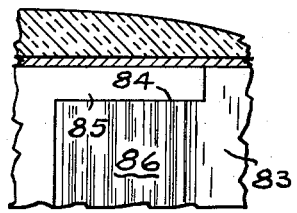
FIG. 4 is a view on line 4—4 of FIG. 3.

In FIGS. 3 and 4 is shown a preferred form in cross section of the axial portion and adjacent coils of an exchanger embodying my invention. Wall 80 is disposed flaring or curved toward the center of the compartment or chamber 81 in forming the expanded inlet 82 for the incoming fluid or water which may be in the vapor phase or close thereto. By this expanded inlet 82, the force or velocity of the incoming water is reduced, which facilitates settling conditions. Be it noted that the centrifugal force remaining in the fluid will aid in the settling operation of the solutes either in the solid or dissolved condition. Wall 83 is shorter than wall 80 and is formed with an end wall 84. Wall 82, see FIG. 4, is cut down to form the outlet 85, the edge of which, and likewise that of end wall 84, may be of knife-like sharpness to provide for skimming off the top liquid in the axial chamber 81. Heating elements 88 are disposed within the compartment or chamber 81 in such position as may be found most advantageous for the serving as baffling means to obstruct the incoming stream. The portion 86 of the wall 83 may be vertically corrugated to contribute to the settling operation by creating a riffling effect over that portion upon which the centrifugal forces cause the incoming fluid to impinge.

FIGS. 5 and 6 represent special form of grooves 89 provided in the inner side of the top and bottom end members. Said grooves are wide in their top portion and of a narrow sheet edge pinching V shape 89′ in the innermost portion. Such form of the grooves facilitates the insertion of the edges of the sheets 55 and 56 into sealing relation in the top and bottom end members 66.

In FIG. 7 a plurality of the mechanism or device illustrated in FIGS. 1 and 2 are shown in stacked formation for accumulative effect in securing the joint action of the several units in multiplying the yield or output.

The separate devices or units as a whole are designated in FIG. 7 by the numerals 90a, 90b and 90c, held together in stacked or superimposed position by the skeleton-like frame 91 preferably held above the floor or bottom of the sea by legs 92, so that, for one reason at least, there will be small chance of the expelled heavy brine, from outlet channel 52, finding its way back into inlet channel 51, as such brine may be collected in pipe 92a and conducted away from the device. A common outlet conduit 93 may join the outlet conduits 94 of each of the units 90 for conveying the combined output to the reservoirs on the shore. Likewise, the electric conductors 95 of each unit are led through the conduit 93 wherein they may be united into a single conductor 95a which may be protected by conduit 93 in extending to shore.

*Mode of Operation of Mechanism Shown in FIGS. 1 to 7*

Much of the mode of operation of the form of the device, as well as the method, of my invention and discovery is given with the mechanical description above, as well as in the introductory pages wherein are set forth conditions to be provided, and which the invention and discovery here presented supplies.

In continuously subjecting sea water to its critical pressure and continuous application of heat of a magnitude rising to the critical temperature of sea water, the paralleling in spiral and interlocking arrangement provides for a plurality of functioning of the parts which is characterized by the utmost efficiency. Such arrangement provides for the presenting of the inlet flow of cold water in a narrow channel of rectangular transverse sectional form, said channel thus having extended heat transferring walls 55 and 56 of smooth and polished surface for the water confined as a sheet-like body. Such arrangement also provides for the channel 52 for the outlet flow of heated water after going through the vapor stage to be spread out and disposed in a channel contacting the inlet channel 51 of like form as the said inlet channel is of like extended wall of smooth and polished surface; the wall 55 for the inlet channel conducting the cold water on one side serving also as one wall for the channel conducting the hot water in the outlet channel 52—the said wall constituting, in short, a dividing wall between the two oppositely flowing streams. Thus, the hot stream is spread out and in a form to surrender all its heat to the similarly spread out cold water in the inlet channel.

Furthermore, despite the high pressure of critical magnitude under which the heat exchanger 50 of my invention and discovery may operate, a most amazing condition is provided, namely, a very thin sheet of metal or heat transferring material may be employed to constitute the walls 55 and 56 of the inlet and outlet channels—in fact, such walls may be described as "paper thin." Thus, the heat is transferred with utmost efficiency, both as to the thinness of the separating wall and as to the form of the sheet of water receiving the heat in the inlet channel and the form of the sheet of water transferring its heat in the outlet channel. Such thinness of wall sheet is rendered possible in said mechanism by reason of the providing of balanced pressures on each side of the channel walls. It is to be noted that the water in both the inlet and outlet channels is under the same pressure, the pressure of critical magnitude for sea water, so that the water in each channel supports the water in the other channel.

The spiral coiling of the channels 51 and 52 provides for an axial compartment 53, wherein heating means 63, to provide the critical temperature, may be most efficiently located. Such spiral coiling also provides for using the incoming cold water in inlet channel 51 to act as insulating means for the water in the outlet channel 52 so as to take all the heat from such hot water and thus save the heating of such water by so much after it reaches the axial chamber or compartment 53 of the spiral coils. Also, such taking of the heat, or cooling of the water in the outlet channel, is important as the water must be transferred from the vapor phase to water of a non-critical temperature so that the solutes or salt will be precipitated or formed into heavy brine and thus in a condition to be separated from the "fresh" water. After the water in the outlet channel 52 gives up its heat, or is cooled by the cold water in the inlet channel 51, it is less solvent of the salt, and so it is important that its temperature be reduced to that of cold water.

Furthermore, the spiral winding of the coils provides for the flowing stream of water in the inlet and outlet channels 51 and 52 to acquire a centrifugal force and thus cause the stream to progressively present different portions of the stream to contact with the walls 55 and 56 of the channels, thereby providing for the fullest transfer of heat between the two counterflowing streams of fluid or liquid.

In all heat exchangers there is a tendency for a layer of water to adhere to the wall of the exchanger. This layer of water next to the wall must be broken up and made to move into the stream of water passing through the device, because such layer of water is very insulating in character and prevents efficient operation of the heat exchanger in conveying heat to the other fluid in which the temperature is to be raised, or lowered.

In the device of my invention and discovery, the overcoming of the problem of adhering layer of water is accomplished as follows: Consider the situation of the stream 52 in the hot water passageway of the spiral form of heat exchanger as shown herein. This is disposed, as shown in the drawing, as lying between the water in a cold water channel on one side and a cold water channel on the other side. The water in the cold or inlet channel 51 would be of a progressively different temperature because the water in one said channel will have been exposed to the heat of the water in the hot channel for a longer period than will the other. Thus, the temperature of the hot water on the side wall next to or toward the axis of the heat exchanger, that is, the heating compartment 53 axially or centrally located, would be higher than the layer of water on the opposite wall which is more remote from the axial or center compartment 53. Since the water on the two walls, the inner and the outer walls of the hot outlet channel, is thus provided with a different temperature, one much hotter than the other, there will be a tendency for the water to move vertically lower in the passageway or channel on one side and to rise on the other side. That is, on the side wall next to the hot axial chamber, the water within the passageway will rise, and on the outer side of the passageway which is colder and more remote from the axial chamber, the water will tend to move lower. In this way, a transverse circulation of convectional currents is created in the stream as it moves spirally through its channel in hot and cold conduits 51 and 52 which overcomes the building up of a more or less static layer. Thus, a new portion of the stream is continuously presented to the walls of its respective conduit.

In FIG. 8 a modified form of my invention is illustrated with the heat exchanger 110 disposed within a sphere 111 which may be formed of two hemispherical halves 112 and 113, the dividing of which may extend horizontally with flanges 114 and 115 having bolts 116. Said dividing line may be disposed horizontally, vertically or otherwise. The water within the sphere 111 may be subject to the critical pressure of sea water by pumping operation, and thus make possible the operation of the heat exchanger of my invention on land or the sea shore, i.e., independent of being located at depths of the sea.

In detail, a high pressure pump 118 connected to sphere 111 by pipe 119 having shut-off valve 120, is provided to create a pressure of about 300 atmospheres, i.e., equal to the pressure at the ten thousand foot level or depth of the sea as set forth for the form of the device shown in FIGS. 1 to 7. On each side of pump 118 are oppositely working valves 118a and 118b. Thus, within the sphere 111 may be created substantially the same pressure condition as described for the required depth of the sea, which condition is maintained substantially constant by means of the provision of the compressed non-soluble gas 121 (preferably helium) at the top of the inside of the sphere, or same could be disposed within a dome 112, see modified form, FIG. 10, formed in the top portion of the sphere 177. Of course, a flexible partition or piston across the mouth of the dome would permit the use of a water soluble gas.

In FIG. 9 (same being plan view on pump level 123 and turned 90° to the view in FIG. 8) the heat exchanger 110 may be of the same construction as shown in FIGS. 1 to 7 except that circulation in the inlet and outlet channels is maintained by balanced pump mechanism 123, having a supply inlet pipe 124 back of pipe 127 in FIG. 8 for sea water connected to a source of sea water and leading to the inside of the sphere, said pipe having oppositely working valves 125 and 126. Outlet pipe 127 leads from the fresh water one-half portion of outlet channel 128 through the sphere 110 and thence to pump mechanism 123 which pump has oppositely working valves 129 and 130, and also piston 131 which may be mounted on rod 132 operated by motor 133, diagrammatically shown in FIG. 9. (For more complete illustration see FIG. 11.) This outlet pipe 127 leads to a tank or reservoir for collecting the treated or fresh water.

Outlet channel 128, FIG. 9, also has outlet pipe 134, FIG. 8, leading from the brine portion or half of channel 128 formed by the horizontally dividing wall 135 in said channel. Outlet pipe 134 leads through valve 136 to pump 137 and thence through valve 136a, by means of which brine formed by the operation of the heat exchanger is removed therefrom.

Heating means 138 in the form of an electrical heater is provided in the central compartment of the heat exchanger 110, electrical conductors 139 and 140 are led to said heater through insulation 139a of the end members 139b. The other insulation 140a is in end member 140b.

The mode of operation of the modified form of my invention illustrated in FIG. 8 is set forth in part above, but more particularly its operation is as follows:

Helium or a gas substantially insoluble in water is conducted into said sphere, displacing the air therein through valve 110a in the top of sphere 110. Air, it is to be noted, is absorbable by water and is objectionable in a heat exchanger.

The high pressure pump 118 pumps sea water into the sphere 110 creating therein conditions similar to those at the bottom of the sea wherein the device of my invention of FIGS. 1 and 2 is designed to operate.

A balanced pressure pump mechanism 123 provides for admitting a metered amount of sea water with each stroke into the sphere 110 against the pressure therein and also provides for removing from the sphere 110 an equal amount of treated water from outlet channel 128 with each stroke thereby maintaining substantially uniform pressure therein. This pump mechanism 123 accomplishes the above functions as follows: The motor 133 reciprocates piston 131 in cylinder 131a having end portions 131b and 131c. As the piston 131 is moved into end portion 131b, valve 126 is mechanically closed and immediately thereafter valve 125 is opened so that piston 131 forces the water trapped in cylinder end portion 131b into the sphere 111 which water may enter the inlet channel 141 through the intake 142 of housing 143 of the heat exchanger 110. Simultaneously with piston 131 reaching the end of its stroke in end portion 131b, valve 129 opens and fluid which has been treated enters cylinder end portion 131c immediately after oppositely working valve 130 is mechanically closed in properly timed sequence by mechanism to be described. Such closing must positively not permit the heavy pressure within sphere 111 to be exposed to an open way in outlet pipe 127. Thus, this fluid under pressure of critical magnitude (approximately forty-five hundred pounds) bears against the piston which is engaging a like heavy pressure on its opposite side, so that the two oppositely directed pressures are substantially balanced and the motor 133 has only to actuate the piston 131 to overcome relatively light resistance forces.

Completing the stroke of piston 131, as motor 133 actuates the said piston 131 into end portion 131c, valve 125 is mechanically closed in proper timed sequence by valve control mechanism described below, and likewise valve 126 is opened in timed sequence to permit the entrance or filling of cylinder end portion 131b with a new supply of sea water as piston 131 is moved into cylinder end 131c. Valves 125 and 129 are simultaneously actuated into open position by said valve control mechanism described below. But such opening of valves 125 and 129 occurs only after the simultaneous closing of valves 126 and 130. As piston 131 moves into cylinder end portion 131c, valve 129 is mechanically closed in timed sequence and valve 130 is mechanically opened in proper timed sequence to permit the discharge of the water or treated fluid in said end portion 131c. On this return stroke of the piston 131 into cylinder end portion 131c, there is substantially little pressure on the 131b end portion side and a similar condition of substantially little pressure on the 131c end portion side of the piston 131 as valve 130 is mechanically opened to let the water or fluid in 131c end portion to discharge through said valve 130. As piston 131 completes its stroke into end portion 131c of the cylinder 131a, valves 125 and 129 close simultaneously and do so prior to the simultaneous opening of valves 126 and 130. By this arrangement substantially the same volume of water as measured in cylinder 131a is forced into the sphere 111 and is likewise removed. The sea water in 131b ordinarily would be cold while the water in 131c ordinarily would be of a higher temperature so that while equal volumes of water would be injected and withdrawn from sphere 111, nevertheless they would not be of same density, so that the volume of cold sea water injected would be of greater weight than that of the volume withdrawn. This would result in increasing the pressure within the sphere 111. The helium gas 121 would be compressed and would take care of the increased pressure to a certain magnitude. Hence, for greater safety, relief valve 144 is provided for the escape of cold sea water from sphere 111.

For the removal of the brine or salt or reject fluid from that portion of outlet channel 128 below the dividing wall 135, conduit 134 is provided in connection with balanced pressure pump 137 which has piston rod 146 and valves 136 and 136a and all parts corresponding to and functioning the same as balanced pressure pump 123.

The mode of operation of these parts is like that described for cylinder 131a and all its associated conduits and valves therein.

See FIG. 11 for mechanism for positively sequentially opening and closing the valves 125, 129, 126 and 130 which are on the horizontal level of pump 123.

Valve 125 is provided with gear 170 and valve 129 has gear 171, each of these gears meshing with rack 172, one end of which extends through solenoid 173 which moves the valves into open position, and also through solenoid 174 which moves the valves into closed position. Valve 126 has gear 175 and valve 130 has gear 176, which mesh with rack 177, one end of which extends through solenoid 178 which closes the valves and through solenoid 179 which opens the valves.

A source of D.C. electric current 180 has its positive pole 181 connected by conductor 182 to the positive pole 183 of solenoid 173. A branch 184 of this conductor 182 is connected to positive pole 185 of solenoid 174. Another conductor 186 extends from positive pole 181 to the positive pole 187 of solenoid 178, with a branch 188 extending to the positive pole 189 of solenoid 179.

From the negative pole 190 of the source of current 180, negative conductor 191 connects with contact point 192 which is engageable with contact plate 168 shown in dotted line when the same is caused to revolve. On each side of contact point 192 are contact points 193 and 194 which are likewise engageable with plate 168 when the same is caused to revolve. A branch 195 of negative conductor 191 extends to contact point 196 which is engageable with contact plate 168 shown in full line. On each side of contact point 196 are contact points 197 and 198 which are also engageable with plate 168 when the disc is caused to revolve.

Negative pole 199 of solenoid 173 has conductor 200 extending to contact point 198. Negative pole 201 of solenoid 174 has conductor 202 extending to contact point 194. Negative pole 203 of solenoid 178 has conductor 204 extending to contact point 197. Negative pole 205 has coductor 206 extending to contact point 193.

*Mode of Operation of Control Mechanism Shown in FIG. 11 (Also See FIG. 9)*

The balanced pressure pump mechanism of pump 123 will be used in this description. Piston 131 on piston rod 132 is at the end of its stroke in cylinder 131a, i.e., in the end portion 131c of said cylinder, the opposite end of the cylinder being shown at 131b. Starting with the piston 131 in the position shown in FIG. 11, valves 126 and 130 have just been closed, while valves 125 and 129 have in timed sequence just been opened. This was accomplished by the contact plate 168 on the disc 165 having just passed contact point 197 and having engaged contact points 196 and 198, thereby causing solenoid 173 to open valves 125 and 129 by moving rack 172 to the right of the drawing shown in FIG. 11. By joining contact points 197 and 198, it is manifest that valve closing solenoid 178 has been actuated to close valves 126 and 130 just previous to contact plate 168 engaging contact points 196 and 198 because contact point 197 is the first to be engaged as the disc 165 moves in counterclockwise direction.

As contact plate 168 moves to bridge contact points 196 and 198, opening solenoid 173 is operated and pulls rack 172 to the right thereby causing valves 125 and 129 to open. As disc 165 continues to revolve it moves piston 131 to the end of the cylinder at 131b thereby forcing the sea water in the cylinder end portion 131b through open valve 125 into the sphere. It will be noted that the fresh water coming from the sphere and passing through the open valve 129 operates upon the end of the piston in the 131c end of the cylinder and thereby counterbalances the pressure on the opposite side, so that the motor has only to overcome a nominal resistance to the actuation of the piston in moving it to the end of the cylinder 131b. Simultaneoulsy the timing disc 165 rotates 180°, bringing the contact plate 168 from position "a" to position "b," i.e., to contact points 194 and 193. As contact plate 168 moves up to the position it first contacts the two contacts 194 and 193 thereby operating closure solenoid 174 which moves the rack 172 to the left and closes valves 125 and 129.

Immediately afterward, the contact plate 168 moves as shown in dotted line across points 192 and 193, operating opening solenoid 179 to move rack 177 to the right and open valves 126 and 130. Then, upon the disc 165 continuing to rotate, piston rod 132 with piston 131 moves toward the 131c end of the cylinder 131a, i.e., toward the starting position. In doing so, it forces the fresh water that was allowed to flow into cylinder end 131c through open valve 130 to a storage reservoir. Thereupon, as piston 131 reached the end of its stroke in cylinder end 131c, sea water enters through open valve 126 and fills the cylinder 131a in preparation for being discharged through pipe 124 into the space within the sphere surrounding the heat exchanger 110, from which space it enters the exchanger through ports 142, i.e., into the inlet passageway 141 of the heat exchanger. As the pivot point 207 of the crank 166 passes from dotted line position Y where the piston 131 is at the end of its stroke in the end 131b of the cylinder, it will be noted that the contact plate 168 has caused the valves 126 and 130 to be closed, and shortly thereafter as the contact plate 168 moves across the succeeding contact points 196 and 198, valves 125 and 129 are caused to be opened. Then, as pivot point 207 moves to position X, the contact plate 168 has passed points 194 and 192 operating to close valves 125 and 129; then as the plate 168 continues to rotate it contacts points 192 and 193, and in a succeeding moment opens valves 126 and 130. During this time, there is the expulsion of the fresh water in the end portion 131c of the cylinder and this fresh water is caused to move into the storage tank. Likewise, there is the filling of the cylinder end 131b with salt water. Then, as the piston is in the action of moving to the end of the cylinder 131c, i.e., when the pivot point 207 is moving from Y to X position, we have contact plate 168 having closed the gap between points 197 and 196 which operates to close valves 126 and 130, and as the plate 168 continues to move it closes the gap between contact points 196 and 198, thereupon opening valves 125 and 129, which completes the cycle.

This same valve control mechanism is provided for balanced pressure pump 137 and its associated conduits, cylinders, piston rod 146 and motor—in fact all parts being duplicates of those just set forth for balanced pressure pump 123, the result of the operation of which balanced pressure pumps is to introduce a like amount of salt water to be treated for every unit of fresh water and brine treated and removed from the sphere 111.

The above-described method of valve operation is symbolic and designed to show the sequence timing of movements of the piston 131 and associated valves. Instead of using gear-operated solenoids, the valves may be operated by a system of cams mounted on the shaft of the motor. Such cams are disposed to produce the proper motion and sequence timing of the valves, as is common in mechanical operations. Thus the mechanism can be made entirely mechanical by using commonly employed mechanical timing devices without the use of solenoids.

In order to secure smooth action in the mechanism, the crank shaft employed should have shock absorber with plunger-type connection to take up the water hammer shock which usually occurs when any valve is suddenly closed.

In FIGS. 12, 13, and 14 a modified form of the invention is illustrated disposed on its edge, i.e., with the axis of the passageways disposed horizontally. The inlet passageway 220 receiving salt water through conduit 221 extends in a spiral interlocking relation to the outlet passageway 222 which has a fresh water outlet 223 and a brine outlet 223a when the device is located on the floor of the sea. To initiate a siphon action, back pressure on the fresh water outlet would be applied by a pump at the surface of the ocean after the device had been in operation so as to first have brine formed in the passageway. Stopping the back pressure would let the siphon proceed in operation. Inlet passageway 220 opens at 224 into the axial chamber 225 in which is mounted a hopper 226. This hopper has for one portion of the length a restricted outlet 227, extending a portion of the length of said hopper, which opens directly into outlet passageway 228 which is the passageway for the heavy brine part of outlet passageway 222, the brine portion of 222 being separated from the fresh water portion of 222 by spacer-divider means 229 which extends through the length of passageway 222 dividing the same into two halves or other proportions as may be desired. As the sea water enters at 224 into axial chamber 225 it is diverted downwardly as hopper 226 has its walls curved and connecting with passageway walls at 230. Thus all entering sea water must flow downwardly as indicated by arrows and pass to the opposite side of the axial chamber by flowing past and beneath the slanting floor 231 of the hopper, and then it fills the axial chamber and overflows into the hopper over its upper edge. Also the salt water may pass through a series of perforations 232 and 233 disposed horizontally, i.e., longitudinally of the hopper 226. Also perforations 234 may be disposed in the rear part of the wall of the incoming passageway 220 thereby cutting down turbulence. Also of course, a relatively large sized axial compartment would serve to reduce turbulence and thus facilitate the settling process. Electric coils 235, 236, 237 and 238 serve to break up the force of the incoming salt water and thereby act as baffles. The said water may be in the vapor phase, or close to said phase. As the water passes into the hopper 226 the brine or salt crystals will be precipitated and caused to flow through the restricted outlet 227. The floor of the hopper 226 at the opposite end as viewed in FIG. 13 slopes toward the restricted opening 227 as appears in the longitudinal vertical section in FIG. 12.

In FIG. 15 a plurality of heat exchanger units 240, 241, 242, 243 and 244 are disposed on edge, i.e., with the axis of the axial chamber disposed horizontally. These are shown encased in a cylindrical housing 245 and are provided with balanced pressure pump means 246, for admitting salt water to be treated from conduit 247 to the interior of cylindrical housing 245 from which the salt water enters the inlet channels of the several heat exchangers 240–244, as shown in FIG. 9 (see conduit 124, and openings 142 in casing or housing 110). Balanced pressure pump means 246 also has conduit 248 through which the treated water, i.e., the fresh water is withdrawn and connects with conduit 249 which connects with the fresh water outlet half of the channels of the heat exchanger.

Balanced pressure pump 250 has conduit 251 to admit salt water to be treated into cylindrical housing 245 and thence into the inlet channels as shown and described in FIG. 9. Said balanced pressure pump 250 also has conduit 252 through which the brine water is withdrawn from the lower half of the outlet channel as shown and described for FIG. 8.

Pressure pump 253 and its associated valves at the start functions to fill cylindrical housing 245 and the heat exchangers 240–244 with salt water at the desired high critical pressure of salt water.

The mode of operation of the plurality of heat exchangers as shown in FIG. 15 is the same as for the individual exchangers of FIGS. 8 and 9, only in FIG. 15 the plurality of exchangers is shown connected for increased output. The balanced pressure pumps 246 and 253 operate similarly to those described in FIGS. 8, 9, and 11.

In FIG. 16 a modified form of mounting the heat exchanger is shown wherein the exchanger may be tilted to cause the heavy brine to gravitate towards one end of the exchanger. Heat exchanger 260, similar in construction to that shown in FIG. 12, is mounted on tiltable platform 261 which is pivoted at 262. Hoisting means symbolically shown as a jack 263 may be employed to tilt the exchanger 260 clockwise (see arrow) so that the heavy brine will flow towards the pivot end, that is, away from the spacer-divider means 229 (see FIG. 12). This will facilitate separation and removal of the brine in the heat exchanger.

In the modified form shown in FIG. 17, the cold sea water is caused to enter the inlet passageway 271 of the device 270 by way of conduit 272 having a branch 273. Passageway 271 enters directly into the beginning of the inlet passageway next to the outside shell 274 while branch 273 leads the cold water into the inlet channel after one revolution or after one loop of the inlet channel, which channel after the one revolution has a partition 276 extending part way towards the axial compartment 277 to prevent the incoming cold sea water from mixing with the warmer sea water of the other half of the inlet channel. This arrangement brings cold sea water upon its first entrance into the device in direct contact with both sides of the outlet passageway 275, thereby recovering more completely the heat from the outwardly flowing treated water. Such an arrangement operates to absorb the heat in the very area where it is most difficult to recover the heat in commonly designed heat exchangers because near the usual outlet points the difference in temperature between the outwardly flowing stream and the inwardly flowing is very small. Where temperature difference is small heat transfer is very slow. Both disposing of the inlet and outlet water in the spiral counterflowing arrangement of my invention with the divided channel and double entrance for introducing the cold sea water provides for exposure for such an extended period as well as extended area and to freshly entering cold water that a very full recovery of heat is achieved.

In FIGS. 18 and 19 a modified form of my invention is shown in which a sheet or strip 280 of desired width and length of malleable material as copper has a plurality of longitudinally disposed conduits 281 throughout the length of the strip or sheet 280. Such a strip or sheet 280 can be formed into a coil leaving a space which may form the outlet channel or passageway 282 between successive spiral coils of the said strip or sheet 280. Such coiling is done in every way as set forth in the drawings and specification hereof. The conduits 281 in this sheet of malleable material are collapsed before coiling and thus it is possible to coil the same.

After being so spirally coiled, the conduits 281 may be connected to a source of fluid pressure (compressed air or liquid) which causes the said conduits to be expanded to assume a fixed tubular form which in cross section may be of oval or circular form connected by a web 286. This type of copper sheet is an article of commerce presently on the market. Water, oil or other liquid may be caused to circulate through inlet passageway or conduits 281 and heated to a desired temperature and such liquid may be withdrawn from the axial compartment 283. Heating means, as gases or exhaust gases, may be led into the axial compartment 283 through inlet 284 in end wall 285. There the heated gases may spread out into outlet passageways or channels 282 and thus caused to flow in a counterflow direction to the incoming liquid on its way to the axial chamber 283.

This copper arrangement for the inlet conduit passageway or channel 281 is a preferred form for the same but said inlet channels may be of the form as shown and described in the previous drawings wherein the liquid is conveyed to the axial compartment and emptied therein and then flow out from there to the outlet passageway precisely as described for FIGS. 1–15. In short, the forming of the inlet passageways of FIGS. 1–15 may readily be constructed as described for the device as shown in FIGS. 18 and 19. For use of different solutions there would be the necessity of coating the copper against corrosion for that particular solution, if such was the material from which the device was formed. In the case of salt water, the metal or coating therefor should be nickel or otherwise metal highly resistant to corrosion. This applies, of course, throughout the devices of all the figures. The said sheet material with the collapsed conduits and then successively expanded may be employed in either the inlet or outlet passageways. If used for the inlet, then the space between the coils would be the outlet passageway and vice versa. The axial compartment would be present even when employed for introducing the heated gases into the outlet passageway. It will be understood that it is necessary to have the conduits in the sheet structure initially collapsed in order to coil the same in the spiral form to provide the inlet passageways 281 and the space between the coils to form the outlet passageways. In short, it is necessary to have said conduits collapsed in order to coil at all, i.e., for a heat exchanger of normal or usual size.

In operation the mechanism of FIGS. 18 and 19 may be used as follows: one such heat exchanger may be used to produce steam from the exhaust gases of a motor and a second such heat exchanger of like character and construction may be used to introduce oil to be heated into the inlet passageway and steam produced in the first heat exchanger led to the axial chamber of the second heat exchanger then to the outlet channel leading from the axial chamber. This operation is in fact set forth in FIGS. 18 and 19 and it is intended here only to show a specific application of such devices.

*Summary*

In general, the mode of operation of the devices embodying my invention and discovery has been set forth in the above description of the mechanism construction. The various forms of the device, as has been explained, are suitable for operation at the bottom of the sea where advantage may be taken of the high pressure of the superimposed water, to provide the desired critical pressure of sea water, or the heat exchanger may operate with a casing which may be of desired form, the spherical and cylindrical forms being shown. The casing arrangement adapts the invention to be employed above the surface of the ocean, in which case the desired critical pressure is provided by pressure pumps.

The uniqueness of the heat exchanger and its many advantages have been fully detailed and will not be repeated. The efficiency of the device due to its many features, such as thinness of wall despite the high pressures involved in the liquids, and interlocking convolutions renders it outstanding in developing efficiency of heat conservation in creating the critical temperature.

In providing control of the degree of heat within the axial chamber advantage may be taken of the use of the treated water as a conductor of electricity. In this connection, as is well known, the purer the water, the greater the resistance to the passage of electric current. Accordingly, one or more of the elements may be connected through a unit employing the treated water as a conductor. Let it be noted that not all of the heat elements should be thus supplied with water as a part of the conductor but only a part of them. Otherwise there would be no means of starting the heating whenever the flow of current was stopped. Accordingly, as treatment of the water rendered it free of ions, the less current it would convey and therefore function automatically to reduce the amount of current.

In conclusion, it is manifest that my invention and discovery sets forth a most economical solution for the conversion of salt water into potable water, as well as for removing solutes from solutions generally. The heat exchanger is of a character that permits the recovery of the heat employed in treating the solution so as to pre-treat incoming solution, the water flowing through the axial chamber as a part of the inlet area outlet channels. Thus is provided an efficient and economical means for the provision and supplying of water for human, animal, and industrial consumption. Also my invention provides for an efficient heat exchanger by utilizing heated gases or exhaust gases.

I claim:

1. The mechanism for resolving a solution into the solutes and solution components thereof comprising an inlet and an outlet passageway for adjacent counterflowing streams formed of walls in common spirally, interlockingly and parallelingly disposed about an axial compartment which compartment has therein an outlet terminus for said inlet passageway and which compartment has an inlet port for said outlet passageway for the solution which passes through the axial compartment from the said outlet terminus to the said inlet port; said inlet passageway having a branched inlet conduit, one branch introducing the solution to the mechanism at the beginning of the first convolution of the spiral passageway; a partition in said inlet passageway beginning at an advanced portion of the inlet passageway and extending forwardly for a part of the length of said inlet passageway; a second branch of said inlet passageway introducing the solution to a portion of the inlet passageway at an advanced portion of the inlet passageway; and heating means disposed in said axial compartment.

2. The method of separating sea water into its components salt and water of reduced salt content, comprising the steps of withdrawing a first stream of sea water from a body of sea water which body of water is at a pressure at least equal to its critical pressure; moving said stream through an elongated confined spiral path within said body of sea water to an inner zone, which zone and the path of said stream is heat insulated from said body of sea water; heating the stream as it moves inwardly by indirect heat exchange to a temperature approaching the critical temperature of the water of the body of water; further heating said stream within the inner zone to at least the critical temperature of said water; withdrawing from said inner zone a stream of water of reduced salt content; withdrawing a second stream of water from said inner zone of increased salt content, moving each of said last mentioned two streams outwardly in separated confined elongated spiral paths; and cooling each of said last two mentioned streams as they move outwardly by indirect heat exchange contact of said streams with said first stream.

3. The method of separating sea water into its components salt and water of reduced salt content, comprising the steps of withdrawing a first stream of sea water from a body of sea water which body of water is at a pressure at least equal to its critical pressure and is in communication with said body of sea water; moving said stream through an elongated interlockingly, parallelingly and spirally disposed path for adjacent countercurrent flowing within said body of sea water to an inner zone, which zone and the path of said stream is heat insulated from said body of sea water; heating the stream as it moves by indirect heat exchange to a temperature approaching the critical temperature of the water of the stream; further heating said stream within the inner zone to at least the critical temperature of said water while under at least the said critical pressure of that water; withdrawing from the area of said inner zone a stream of water of reduced salt content representing a portion of the withdrawn stream, said stream counterflowing to said first stream having a common wall therebetween; withdrawing a second stream of water of increased salt content from said inner zone; moving each of said last mentioned two streams outwardly in separated confined elongated spiral paths; and cooling each of said last two mentioned streams as they move outwardly by indirect heat exchange contact of said streams with said first stream.

4. The method of resolving a solution into its components of solvent and solid solutes of greater density comprising the steps of withdrawing a first stream of the solution to be treated in sheetlike form from a body of the solution which solution is under a pressure at least equal to its critical pressure; moving said stream to circulate spirally within said body of the solution in a heat transmitting course toward the inner zone of such spiral course, the said circulating stream being in direct open communication with the said body of the solution; heating such solution in the inner portion of its spiral course in supplying the critical temperature thereto in converting the solution while under critical pressure into the vapor phase, separating and precipitating molecules of the solute from the vapor phase in forming a solution of the solutes; withdrawing such solvent in counterflowing stream with respect to said first stream from the inner portion of the spirally flowing first stream; and subjecting the outwardly circulating solvent stream to substantially the same pressure as the first stream in providing a balance of pressure to the counterflowing first stream and causing an exchange of heat between the counterflowing streams; and separating automatically the solvent water from the solution in the outlet stream.

5. The method of resolving salt water into its components of fresh water and brine comprising the steps of withdrawing a first stream of salt water to be treated in sheetlike form from a body of salt water which body of salt water is under a pressure at least equal to its critical pressure; moving said stream to circulate spirally within said body of salt water in a heat transmitting course toward the inner zone of such spiral course, the said circulating stream being in direct open communication with the said body of salt water; heating such salt water in the inner portion of its spiral course in supplying the critical temperature thereto in converting the salt water while under critical pressure into the vapor phase; separating and precipitating molecules of the solute from the vapor phase in forming fresh water and brine; withdrawing such fresh water in counterflowing stream with respect to said first stream from the inner portion of the spirally flowing first stream; and subjecting the outwardly circulating fresh water stream to substantially the same pressure as the first stream in providing a balance of pressure to the counterflowing first stream and causing an exchange of heat between the counterflowing streams; and withdrawing automatically the brine solution in the outlet stream while under critical pressure.

6. The method of resolving a salt water solution into its components of solvents and solutes comprising the steps of withdrawing a first stream of a solution from a body of the solution which body of solution is at a pressure at least equal to its critical pressure; moving said stream through an elongated confined spiral path within said body of sea water to an inner zone, which zone and the path of said stream is heat insulated from said body of solution; heating the stream as it moves inwardly by indirect heat exchange to a temperature approaching the critical temperature of the solution; further directly heating said stream within the inner zone to at least the critical temperature of said solution in converting such solution into the vapor phase; precipitating a portion of the stream in the form of crystals, leaving the solvent; separating the crystals from the solvent; withdrawing said solvent in an outlet stream from said axial zone in counterflowing and in heat transmitting relation to incoming water; separating and withdrawing the solute from the solvent in the form of a brine; and controlling the rate of converting said water into vapor phase by regulating the degree of heat created in said axial compartment.

7. The method of resolving a salt water solution into its components of solvents and salt solutes comprising the steps of continuously withdrawing a stream of sea water from a body of sea water which body of sea water is under critical pressure and conducting said stream in a spiral-like path within said body of sea water in heat transmitting relation counterflowing inlet and two outlet streams to and from the axial zone of said spiral one outlet leading to the surface of the sea and one to the sea from said axial zone; simultaneously subjecting said incoming salt water to a pressure and heat of a magnitude respectively for each which provides at least the critical pressure and critical temperature thereof in converting such water into the vapor phases in providing for molecules of the salt solute to settle therefrom giving fresh water and heavy brine; withdrawing continuously from said axial zone said fresh water in one of said outlets which leads to the surface of the ocean as one defined column and the sea as the undefined column operating after the manner of a manometer.

8. The mechanism of claim 13 further comprising a settling, collecting hopper for precipitated solute disposed in said axial compartment leading said precipitated solute to an outlet of said compartment.

9. A mechanism for separating solutes and solvents of a solution comprising a closed housing for holding a body of solution to be treated with walls of a strength capable of resisting the critical pressure of the solution to be treated; a high pressure pump connected to the inside of said housing in supplying solution under critical pressure within said housing; a body of water non-soluble gas disposable on the top of said solution to be treated; a heat exchanger disposable within a body of solution to be treated and comprising a casing and a pair of spaced metal sheets wound spirally in the form of a convolute about a vertically disposed axial compartment providing adjacent counter flowing streams from said body of solution in heat transmitting relation formed of interlockingly, parallelingly and spirally disposed common wall and providing inlet and outlet passageway reversed on itself at said axis, said inlet passageway having an opening through said casing which opening constitutes a communicating way between said body of solution and said inlet passageway, and said outlet passageway having a continuous water tight divider-spacer means extending longitudinally substantially throughout the length of said outlet dividing said outlet into two passageways, one for the solvent of less density than the solution and one for the solute; heating means in said axial compartment capable of heating the solution to at least its critical temperature; a top and bottom closure means on the two edges of the convolute; a balanced pump means operatively connected to the outlet portion above the divider-spacer means for withdrawal of solvent; a balanced pump means operatively connected to the outlet portion below the divider spacer means for the withdrawal of the solute; valve means for each of said pump means operatively connected thereto for sequential opening and closing.

10. A mechanism for separating solutes from solvents comprising a closed housing for holding a solution to be treated with walls of a strength capable of resisting critical pressure of solution being treated; a heat exchanger immersed in and with its interior in open communication with said solution in said housing having inlet and outlet passageways, said inlet passageway being open to receive solution disposed in said housing said passageways being disposed for adjacent counterflowing streams formed of interlockingly, parallelingly and spirally disposed walls; an axial compartment in said exchanger into which said inlet passageway empties and from which compartment said outlet passageway leads in providing for the conducting of the solution through said compartment and the treated liquids from the compartment; heating means in said compartment; pressure pump for filling said closed housing with a solution to be treated the pressure in said housing being raised by said pump to at least its critical pressure of said solution; a balanced pressure pump for introducing a solution into said closed housing and removing an equal amount volumetrically of the treated solution from said closed housing; a second balanced pump for introducing into said closed housing solution to be treated and simultaneously removing brine from the brine portion of said outlet passageway, the amount of brine being removed being volumetrically equal to the amount of solution introduced to be treated; and electrical control means for each of said balanced pumps each comprising a motor for actuating said pump, a disk rotatably mounted and having a crank shaft connected to the piston of each balanced pump, speed reduction means connecting said motor to said disk, electrical contact member mounted on said disk, two sets of electrical switch means—one set being mounted opposite to the other adjacent said disk engageable by said contact member; a solution inlet conduit communicating with one end of the pump and joining said pump end with the closed housing, valve means in said conduit on each side of said pump, an outlet conduit communicating with said closed housing and with the other end of said pump with valve means on each side of said pump, solenoid means operatively connected to said valves, and electrical conductor means connecting said solenoid means to said sets of electrical switch members whereby the opening and closing of said valve means is automatically controlled.

11. The apparatus of claim 9 further comprising control means for said valves comprising electrical contact means operatively connected to said piston and said valves for timed operation thereof.

12. The apparatus of claim 9 further comprising a disk rotatably mounted and having a crank shaft connected to the piston of each balanced pump, speed reduction means connecting said motor to said disk, electrical contact member mounted on said disk, and two sets of electrical switch means—one set being mounted opposite to the other adjacent said disk engageable by said contact member.

13. In the mechanism adapted for resolving a solution into its components, solvents and solid solutes of greater density, said mechanism adapted to be in direct open communication with the body of said solution, said mechanism having a heat exchanger which has a pair of spaced metal sheets spirally wound in the form of a convolute about an axial chamber having heating means, an inlet passageway reversing on itself at the axial chamber thereby providing an outlet passageway; top and bottom closure means for said spaced metal sheets; a continuous water tight divider-spacer means extending longitudinally substantially throughout the length of said outlet dividing the same into a solvent outlet and a solute outlet and means for withdrawing one of said components.

14. The mechanism for continuously resolving a solution into its components, solvents and solutes comprising a heat exchanger adapted to be immersed in and having its interior adapted to be open and in direct communication with a body of solution which is under a pressure at least critical for that solution, thereby the exit and inlet are under the same pressure; said heat exchanger comprising spaced thin metal sheets wound spirally in the forming of a convolute about an axial compartment of the spiral providing an inlet passageway reversing on itself at said compartment thereby providing a continuous confined inlet and a confined outlet passageway in registering convolute form with said inlet passageway, the walls being under substantially balanced pressure; a plurality of inlet and exit openings for the solution fluids disposed in the vertical side walls of the exchanger which permits inlet fluid to the spiral passageway, an exit solute fluid moving outward through the exit openings by reason of its greater density; a settlement chamber in said axial compartment having expanded inlet walls formed by flaring of said thin metal sheets to reduce centrifugal force of current; exit walls of thin metal sheets defining the leading edge of the outlet passageway being in the form of a step with a knife-like sharpness at the top for skimming off top liquid in settlement chamber; electric heating elements in said settlement chamber of capacity to heat the solution to its critical temperature to transform it to vapor phase, a duct to lead off the solvent by pressure of body of solution; and a continuous water tight divider-spacer means extending longitudinally substantially throughout the length of said outlet dividing the same into a solvent outlet and a solute outlet.

15. In the method of resolving a solution into its components of solvent and solid solutes of greater density, the process characterized by the steps comprising subjecting a body of the solution to a pressure at least equal to its critical pressure; withdrawing from said body a stream of the solution in sheetlike form; moving said stream to circulate spirally within said body of the solution in a heat transmitting course to the inner zone of such spiral course; forming an exit stream from said inner zone, said inlet and exit streams operating to insulate each other, the said streams being in direct open pressure communication with the said body of the solution from which body both streams receive their pressure at least equal to the critical pressure of the solution; and further heating said inlet stream within the inner zone to at least the critical temperature of the solution while under said critical pressure; causing said stream to circulate in said spiral course to said inner zone to be transformed into a vapor phase; removing heat to reduce the vapor phase to a solvent liquid; and removing the solute from said zone.

16. In the method of resolving the solution into its components of solvent and solid solutes of greater density, the process characterized by the steps comprising subjecting a body of the solution to a pressure at least equal to its critical pressure; withdrawing from said body a stream of the solution in sheetlike form; moving said stream to circulate spirally within said body of the solution in a convolute heat transmitting course toward the inner zone of such spiral course; forming a confined inlet and a confined exit stream from said inner zone having balanced pressure, the said streams being in direct open communication with the said body of the solution from which body each stream and zone receives its pressure at least equal to the critical pressure of the solution; and further heating said stream within the inner zone to at least the critical temperature of the solution while under said critical pressure in causing said stream to circulate in said spiral course to said inner zone in forming a vapor phase and in removing heat to change the vapor phase to liquid in removing the solute from said zone in a spiral course transforming the vapor phase into a solvent and solute portion; removing the solvent portion in a column by the pressure derived from the body of the solution and removing the solute against the pressure of the body of the solution by its greater density.

17. The method for continuous separation of solid solutes of greater density from solvents, the steps of subjecting a body of solution to a pressure at least equal to its critical pressure; withdrawing from said body a stream of solution in sheet like form; moving said stream to circulate spirally within said body of the solution in convolute heat exchanging course toward the inner zone of said spiral course; heating the stream at least to its critical temperature while under said critical pressure in transforming the solution into a vapor phase in the inner zone; reducing this vapor phase to an upper solvent and a lower solute portion in an exiting stream by removal of heat and by difference in density; causing said inlet stream and said exiting stream to move and circulate in convolute registration by pressure of the body of the solution and by the removal of the solvent portion in a duct and solute portions by reason of its density being greater than that of the solution, said streams mutually insulating each other in conserving heat and all of said streams being in direct open communication with the body of solution.

References Cited in the file of this patent

UNITED STATES PATENTS

| | | |
|---|---|---|
| 1,204,716 | Thorssell | Nov. 14, 1916 |
| 2,129,300 | Bichowsky | Sept. 6, 1938 |
| 2,131,265 | Bichowsky | Sept. 27, 1938 |
| 2,267,619 | Strom | Dec. 23, 1941 |
| 2,520,186 | Von Platen | Aug. 29, 1950 |
| 2,577,359 | Phipps | Dec. 4, 1951 |
| 2,793,988 | Latham et al. | May 28, 1957 |
| 2,844,464 | Lawton et al. | July 22, 1958 |

FOREIGN PATENTS

| | | |
|---|---|---|
| 21,167 | Sweden | Aug. 31, 1905 |
| 667,359 | France | June 10, 1929 |